Sept. 4, 1962 G. H. PADGETT 3,052,078
PRESSURE ARM ASSEMBLY FOR MOWER BLADES
Filed June 9, 1961 2 Sheets-Sheet 1

INVENTOR.
GEORGE H. PADGETT,
BY
McMorrow, Berman & Davidson
ATTORNEYS.

Sept. 4, 1962 G. H. PADGETT 3,052,078
PRESSURE ARM ASSEMBLY FOR MOWER BLADES
Filed June 9, 1961 2 Sheets-Sheet 2
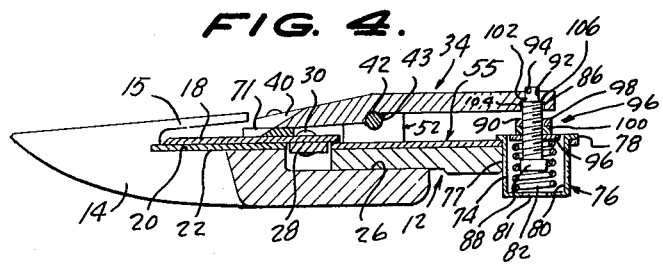
FIG. 4.
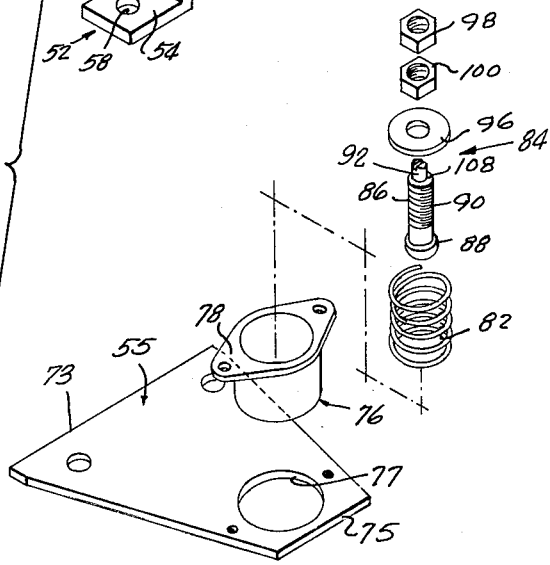
FIG. 5.
INVENTOR.
GEORGE H. PADGETT,
BY
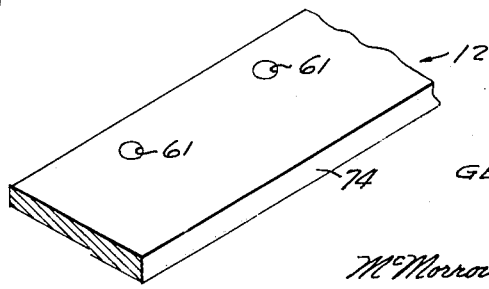
ATTORNEYS.

United States Patent Office 3,052,078
Patented Sept. 4, 1962

3,052,078
PRESSURE ARM ASSEMBLY FOR MOWER BLADES
George H. Padgett, Bergenfield, N.J.
(907 W. Oak Ridge Road, Pine Castle, Fla.)
Filed June 9, 1961, Ser. No. 116,186
2 Claims. (Cl. 56—305)

This invention relates to a novel spring-pressed, adjustable pressure arm assembly for reciprocating mower blades, and constitutes a continuation-in-part of my co-pending application Ser. No. 83,753, filed January 19, 1961, now abandoned.

The primary object of the present invention is the provision of a more efficient, convenient, and practical spring-pressed pressure arm assembly of the kind indicated for replacing the conventional bendable resilient pressure arms, whereby the work and difficulties involved in bending such conventional arms to obtain or restore proper pressure are eliminated, and correct pressure is automatically applied to mower blades and compensations are made for deflections of the mower blades in operation over uneven ground, whereby excessive play and wear between mower blades and fingers of cutter bars is eliminated.

Another object of the invention is the provision of a spring-pressed pressure arm assembly of the character indicated above, which involves improvements over the pressure arm assembly disclosed in my above identified copending application, including more practical and easily installed means for mounting the pressure arm assembly on a mower cutter bar, which eliminates riveting and the trouble and damage of subsequently knocking out rivets for replacing the pressure arm and/or the arm assembly, and a removable and replaceable spring seat on the mounting means, which eliminates welding the same to the cutter bar and facilitates its replacement, when desired, the spring seat being provided with self-draining means.

Other important objects and advantageous features of the invention will be apparent from the following description and the accompanying drawings, wherein, for purposes of illustration only, a specific form of the invention is set forth in detail.

In the drawings:

FIGURE 4 is a vertical transverse section taken on the line 4—4 of FIGURE 1.

FIGURE 5 is an exploded perspective view of said pressure arm assembly.

Figure 1:
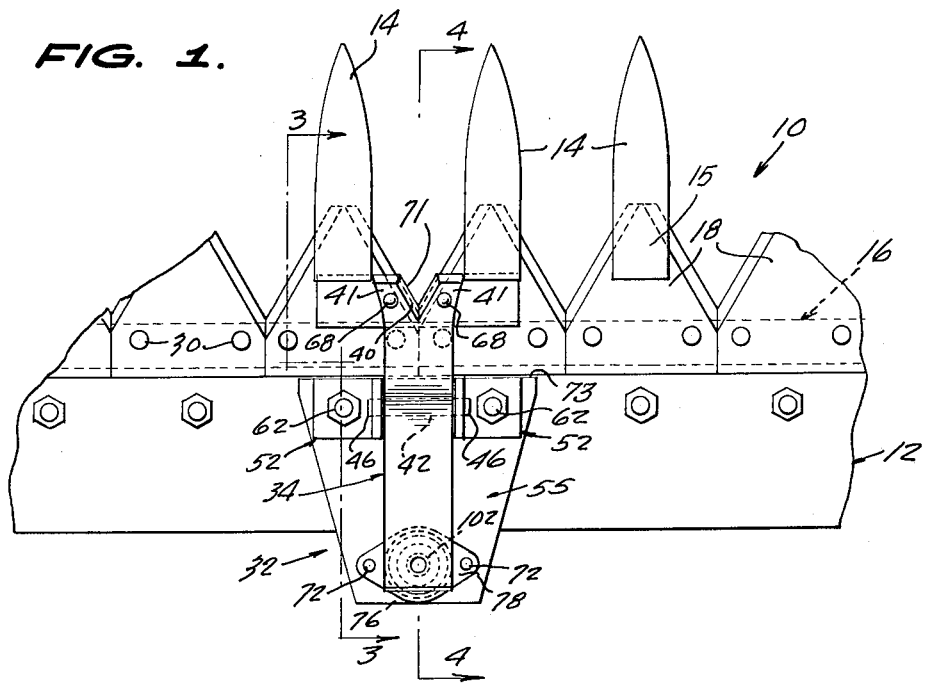
FIGURE 1 is a fragmentary top plan view showing a pressure arm assembly of the present invention installed on a mower.
Figure 2:
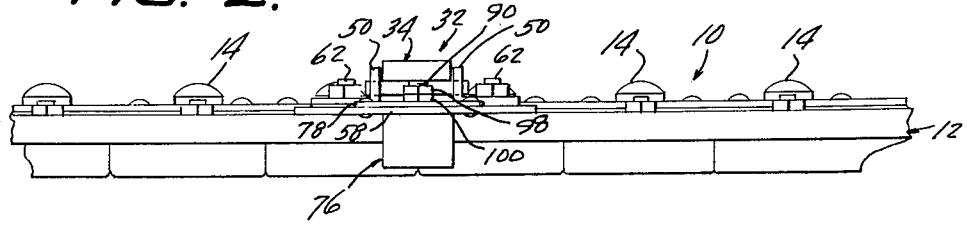
FIGURE 2 is a fragmentary rear elevational view of the device as shown in FIGURE 1.
Figure 3:
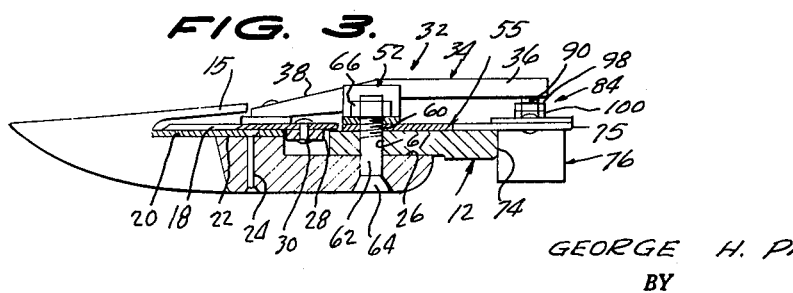
FIGURE 3 is a transverse vertical section taken on the line 3—3 of FIGURE 1.

Referring in detail to the drawings, wherein like numerals designate like parts throughout the several views, the numeral 10 generally designates a conventional reciprocating mower, comprising a cutter bar 12 having fingers 14 spaced therealong and extending forwardly therefrom, and a reciprocating blade 16 having forwardly extending V-shaped teeth 18 spaced therealong. The tops of the cutter bar fingers 14 have intermediate flat upper surfaces 20, on which bearing or wear plates 22 are fixed, as by means of rivets 24, and flat rear end surfaces 26 which are downwardly offset relative to the intermediate surfaces 20. The fingers also include guard members 15 spaced above the surfaces 20 thereof. The blade 16 comprises a bar 28 which is positioned immediately behind the intermediate surfaces 20. The teeth 18 of the blade 16 are secured upon the bar 28, as by means of rivets 30, and extend forwardly from the bar 28 and bear slidably upon the bearing plate 22.

In accordance with the present invention, existing pressure arms, including standard ledger plates, are removed from the cutter bar 12, and are replaced with pressure arm assemblies 32, of the present invention. Each assembly 32 comprises an elongated rock lever or pressure arm 34 having a straight flat rear portion 36 and a forwardly declining forward portion 38. The arm or lever 34 is preferably of flat bar stock of uniform width, except at its forward end, where the same has a forwardly flared end portion provided with a V-shaped notch 40, of substantially the same aperture as that of the notches defined between adjacent teeth 18 of the blade 16, which defines forwardly divergent arms 41.

A transverse rock shaft 42 is suitably fixed, as indicated at 43, to the underside of the pressure arm 34, at meeting of the forward portion 38 and the rear portion 36 thereof, whose ends define pintles 46 which reach beyond opposite sides of the arm 34. The pintles 46 are journaled through holes 48 in the uprights 50 of L-shaped brackets 52 which have foot portions 54.

A longitudinally elongated flat pressure bar 70 is fixed to the undersides of the arms 41 of the pressure arm 34, and extends across the notch 40 and beyond the sides of the pressure arm, and is fixed in place, as by means of replaceable rivets 68. The pressure bar 70 is thereby readily replaceable when worn. The pressure bar 70 is narrower than the lengths of the blade teeth 18, and is long enough to bear downwardly and slidably upon several adjacent teeth 18. The forward edge of the pressure bar 70 is formed with a V-shaped notch 71, which is smaller than and is registered with the pressure arm notch 40.

A truncated triangular horizontal mounting plate 55 overlies the upper surface of the cutter bar 12 and reaches rearwardly beyond the rear edge 74 of the cutter bar, and has a forward edge 73 which is flush with the forward edge of the cutter bar, and a narrower rear edge 75 which is spaced parallel to the rear edge 74 of the cutter bar.

The mounting plate 55 is fixed removably in place by means of bolts 62 which extend upwardly through openings 61 in the rear end portions of teeth 14 and the cutter bar 12, and upwardly through holes 60 in the mounting plate, and holes 58 in the foot portions 54 of the brackets 52, the bolts 62 having heads 64, on their lower ends, which are countersunk in the underside of the cutter bar 12, and nuts 66, on their upper ends, which bear upon the upper surfaces of the bracket foot portions 54. This arrangement renders the pressure arm 34, the brackets 52, and the mounting plate 55 readily removable for repair or replacement.

The mounting plate 55 is formed with a centered circular opening 77, adjacent to its rear end or edge 75, in line with the centerline of the pressure arm 34, in which is seated a removable cup-shaped spring well or seat 76. The well 76 has, around its open top, a lateral flange 78, which bears upon the upper surface of the mounting plate 55, and removable or knockout rivets 72 traverse the flange 78 and the plate 55 and secure the well 76 removably in place. The spring well 76 has a cylindrical side wall 74 and a bottom wall 80 which is provided with a central drain opening 81, which prevents accumulation of water in the well. A vertical coil spring 82 is engaged in the well 76.

The pressure arm or lever 34 is operatively engaged with the spring 82 by means of an adjustable pivot rod assembly 84, which comprises a vertical push rod 86 having an enlarged diameter head 88, on the lower end, a threaded shank 90, having a reduced diameter unthreaded stud 92, on its upper end, having a kerf 94 in its upper end, for receiving an adjusting implement, such as a screwdriver blade. The push rod 86 is centered within the upper part of the spring 82.

The push rod assembly 84 further comprises a rigid washer 96 which is threaded or journalled on the shank 90, that is, the washer is passed over the shank 90 and is freely slidable thereon, bearing upon the upper end of the spring 82, and a lock nut 98 and an adjustment nut 100 which are threaded on the shank, with the adjustment nut 100 bearing upon the washer 96.

The unthreaded stud 92 extends upwardly and slidably through a conformably sized upper portion 102 of a compound bore, formed in the pressure arm 34, at its rear end, this bore having a larger diameter lower portion 104, which opens to the underside of the arm 34 and freely receives the upper end of the threaded shank 90 of the push rod 86. The shoulder 106, defined by the meeting of the bore portions 102 and 104 serves as an abutment for a shoulder 108 on the upper end of the shank 90 around the stud 92.

The engagement of the smooth stud 92 in the unthreaded upper bore portion 102, the free engagement of the upper end of the push rod shank 90 in the lower bore portion 104, provides a lost-motion connection between the pressure arm 34 and the push rod 86, which desirably enables the arm 34, and hence its pressure bar 70, in engagement with the blade teeth 18 of the reciprocating blade 16, to have limited freedom to rise and fall, in following deflections of the blade 16, independently of the dominant and effective pressure exerted by the spring 82, which is compressed between the push rod assembly washer 96 and the bottom wall 80 of the spring well 76.

Proper adjustment of the effective tension of the spring 82, by means of adjustments of the nuts 98 and 100, on the shank 90, while the shank is held stationary, as by means of a screwdriver blade (not shown) engaged in the kerf 94 of the stud 92, produces sufficient downward pressure of the pressure bar 70 upon the blade teeth 18 to hold the teeth down upon the cutter bar fingers 14 in shearing relationship thereto, without producing excessive, wear-producing pressures therebetween. When the blade 16 is deflected upwardly and downwardly, in the course of operation of the mower 10, over rough or uneven ground, the spring 82 alternately expands and contracts, so that the pressure bar 70 follows the blades 18 and keeps them in effective engagement with the cutter bar fingers 14.

Although there has been shown and described a preferred embodiment of the invention, it is to be understood that the invention is not necessarily confined thereto, and that any change or changes in the structure of and in the relative arrangements of components thereof are contemplated as being within the scope of the invention as defined by the claims appended hereto.

What is claimed is:

1. The combination, with a mower having a relatively stationary bar carrying forwardly extending, longitudinally spaced fingers, a longitudinally reciprocable blade having forwardly extending teeth, the fingers including guard members and having upper surfaces, the guard members being spaced above the upper surfaces thereof, the teeth bearing upon the upper surfaces of the fingers, of an adjustable pressure arm assembly comprising:

(a) a pivotally mounted pressure arm on said mower bar;
(b) the pressure arm having a longitudinal pressure bar fixed on its forward end and bearing downwardly upon adjacent blade teeth between the upper surface of the fingers and the guard members thereof; and
(c) adjustable spring biasing means between the distal end of the pressure arm and the mower bar.

2. The combination, with a mower having a relatively stationary bar carrying forwardly extending, longitudinally spaced fingers, a longitudinally reciprocable blade having forwardly extending teeth, the teeth having V-shaped apices therebetween, the fingers including guard members and upper surfaces, the guard members being spaced above the upper surfaces thereof, the teeth bearing upon the upper surfaces of the fingers, of an adjustable pressure arm assembly comprising;

(a) a pivotally mounted pressure arm on said mower bar;
(b) the pressure arm having a longitudinal pressure bar fixed on its forward end and bearing downwardly upon adjacent blade teeth between the upper surfaces of the fingers and the guard members thereof;
(c) said pressure bar having a V-shaped notch therein in registry with the apex of adjacent blade teeth; and
(d) adjustable spring biasing means between the distal end of the pressure arm and the mower bar.

References Cited in the file of this patent

UNITED STATES PATENTS

| | | |
|---|---|---|
| 762,717 | Hobson | June 14, 1904 |
| 2,601,754 | Brekke | July 1, 1952 |

FOREIGN PATENTS

| | | |
|---|---|---|
| 330,433 | Italy | Oct. 14, 1935 |